(12) United States Patent
Zhang et al.

(10) Patent No.: US 8,604,371 B2
(45) Date of Patent: Dec. 10, 2013

(54) ELECTRONIC DEVICE WITH SWITCH CONTROL UNIT

(75) Inventors: Jun-Xiong Zhang, Shenzhen (CN); Zhi-Xin Li, Shenzhen (CN); Bang-Wei Wang, Shenzhen (CN); You-Tao Wang, Shenzhen (CN)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 208 days.

(21) Appl. No.: 13/206,521

(22) Filed: Aug. 10, 2011

(65) Prior Publication Data

US 2012/0160646 A1 Jun. 28, 2012

(51) Int. Cl.
*H01H 9/22* (2006.01)

(52) U.S. Cl.
USPC ......... 200/341; 200/334; 200/50.18; 200/560

(58) Field of Classification Search
USPC .......................................... 200/572, 550, 570
See application file for complete search history.

(56) References Cited

U.S. PATENT DOCUMENTS

| 5,493,084 | A | * | 2/1996 | Whitaker et al. | 200/50.05 |
|---|---|---|---|---|---|
| 5,818,015 | A | * | 10/1998 | Lee et al. | 219/723 |
| 5,967,304 | A | * | 10/1999 | MacKay et al. | 200/565 |
| 6,812,416 | B2 | * | 11/2004 | Tasse | 200/50.01 |
| 7,071,427 | B2 | * | 7/2006 | Houck et al. | 200/50.05 |
| 7,420,133 | B2 | * | 9/2008 | Farrow et al. | 200/50.15 |
| 8,254,089 | B2 | * | 8/2012 | Cosley et al. | 361/640 |
| 8,334,469 | B2 | * | 12/2012 | Takenaka | 200/50.02 |
| 2012/0186960 | A1 | * | 7/2012 | Zhang et al. | 200/5 A |
| 2012/0222942 | A1 | * | 9/2012 | Zhang et al. | 200/18 |

* cited by examiner

*Primary Examiner* — Renee S Luebke
*Assistant Examiner* — Ahmed Saeed
(74) *Attorney, Agent, or Firm* — Altis Law Group, Inc.

(57) ABSTRACT

An electronic device includes a front plate, a top plate, and a switch control unit. The front plate defines a receiving hole therein. The switch control unit includes a mounting frame mounted on the front plate, a switch mounted in the mounting frame, a contact element located above the switch, and a control assembly. When the top plate completely covers the front plate, the top plate presses the contact element, and the contact element resiliently presses the switch to turn on the switch. When the top plate is pulled away from the front plate, the switch is turned off. The control assembly includes a first knob rotatably received in the mounting frame. The first knob includes a pressing portion. When the first knob is rotated from a first position to a second position, the pressing portion abuts against the switch to keep the switch on.

20 Claims, 12 Drawing Sheets

ELECTRONIC DEVICE WITH SWITCH CONTROL UNIT

BACKGROUND

1. Technical Field

The disclosure relates to electronic devices, and particularly to an electronic device with a switch control unit for controlling an automatic power-off function thereof.

2. Description of the Related Art

To protect the personal safety of users, computer server systems are required to automatically power-off when the computer server system is physically opened by a person. A conventional computer server system often includes multiple standard servers mounted in a server cabinet, and a side door mounted on one side of the server cabinet. When the side door of the computer server system is opened by a user, the computer server system automatically powers off, thereby protecting the user's personal safety.

However, for professional staff such as maintenance engineers, having the computer server system automatically power off when the side door is opened is inconvenient. This is because for many or most maintenance operations, power is required to carry out the operation. As a result, the work efficiency of such professional staff may be greatly diminished.

What is desired, therefore, is an electronic device which can overcome the above-described shortcomings.

DETAILED DESCRIPTION

Reference will now be made to the drawing figures to describe the present electronic device in detail.

Figure 1:
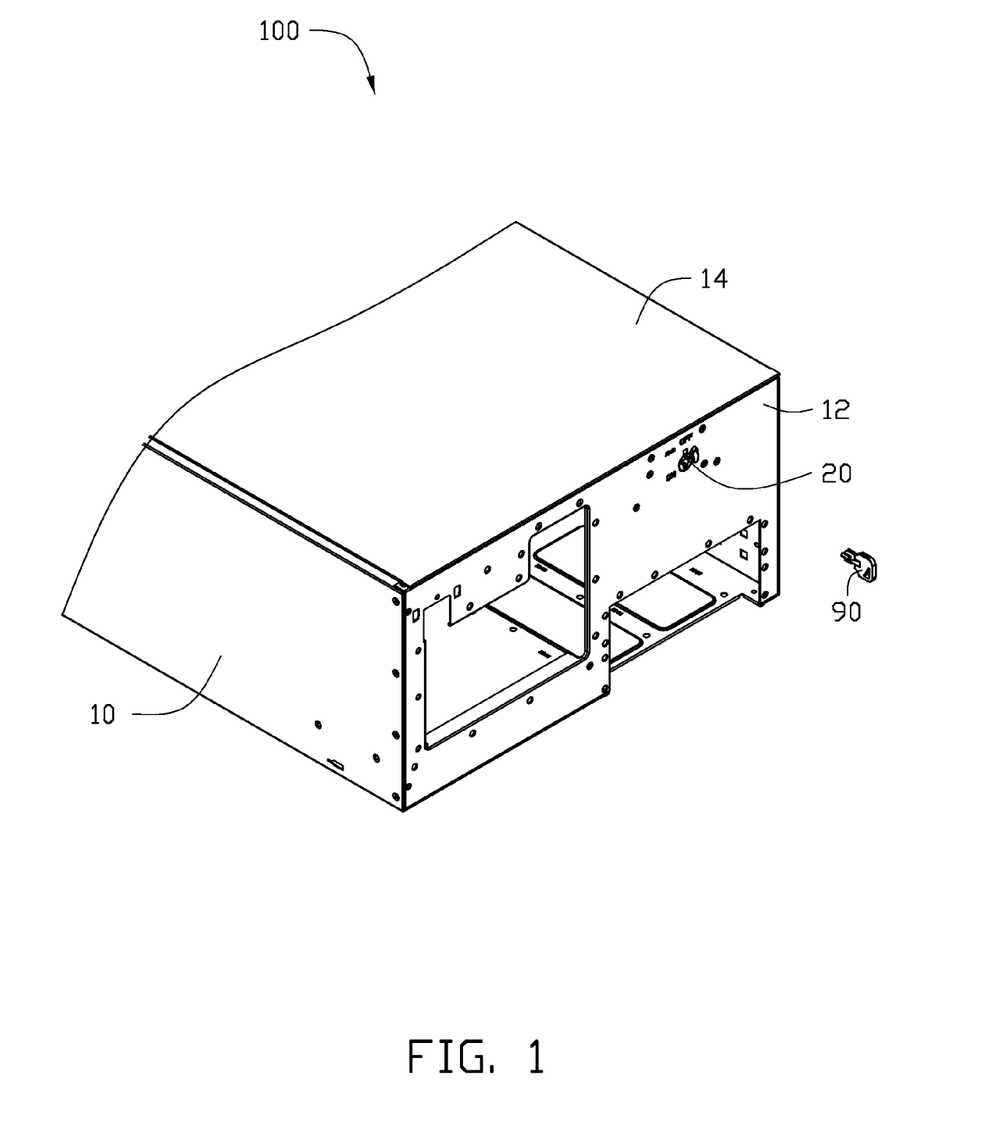
FIG. 1 is a schematic, isometric, assembled view of an electronic device in accordance with an exemplary embodiment.

Referring to FIG. 1, an electronic device 100 in accordance with an exemplary embodiment includes a casing 10, a switch control unit 20 mounted on the casing 10, and a key 90. The casing 10 is generally cuboid, and includes a front plate 12, and a top plate 14 extending perpendicularly from an edge of a top of the front plate 12.

Figure 2:
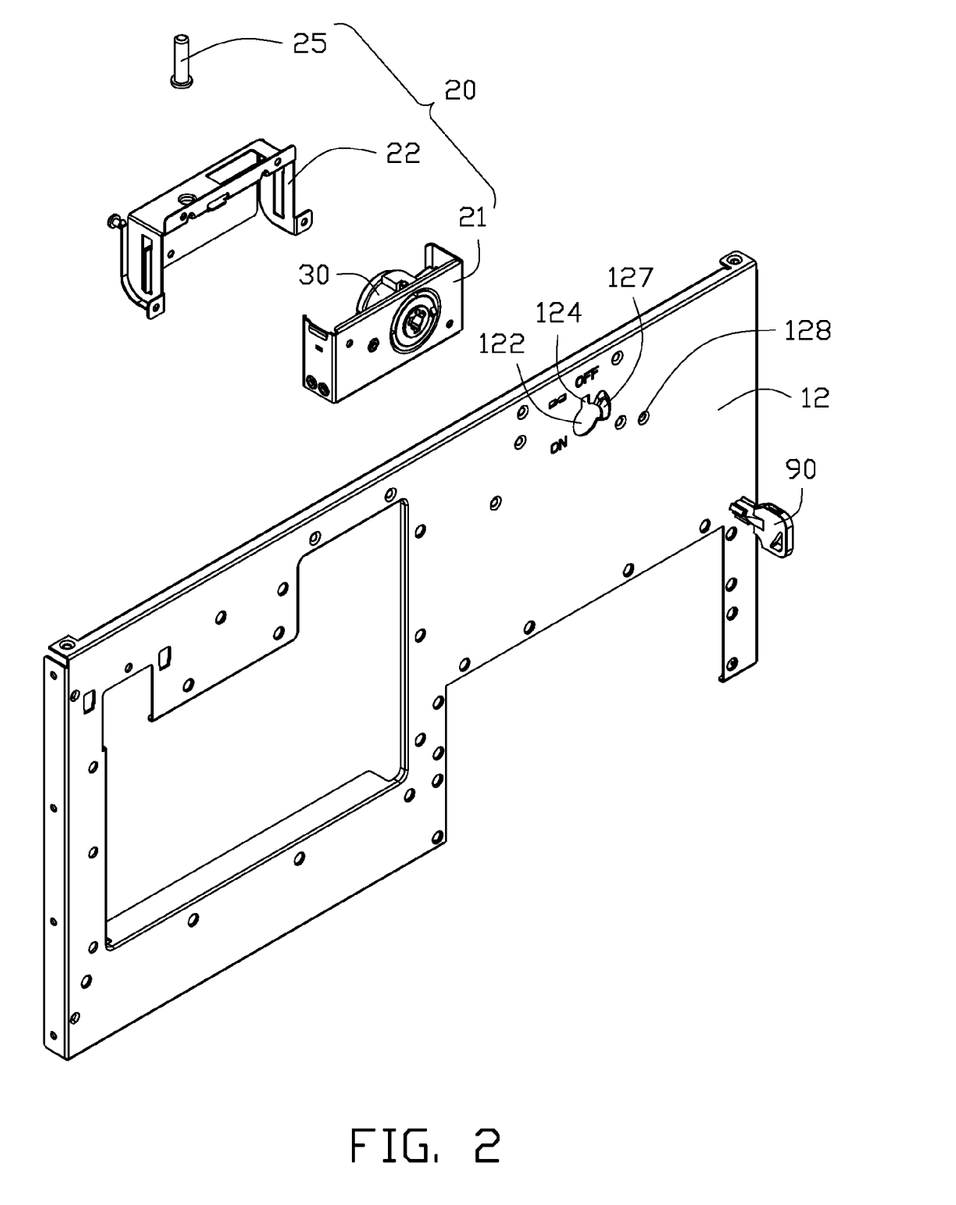
FIG. 2 is an exploded view of the electronic device of FIG. 1, but with a top plate and a side plate thereof omitted.
Figure 3:
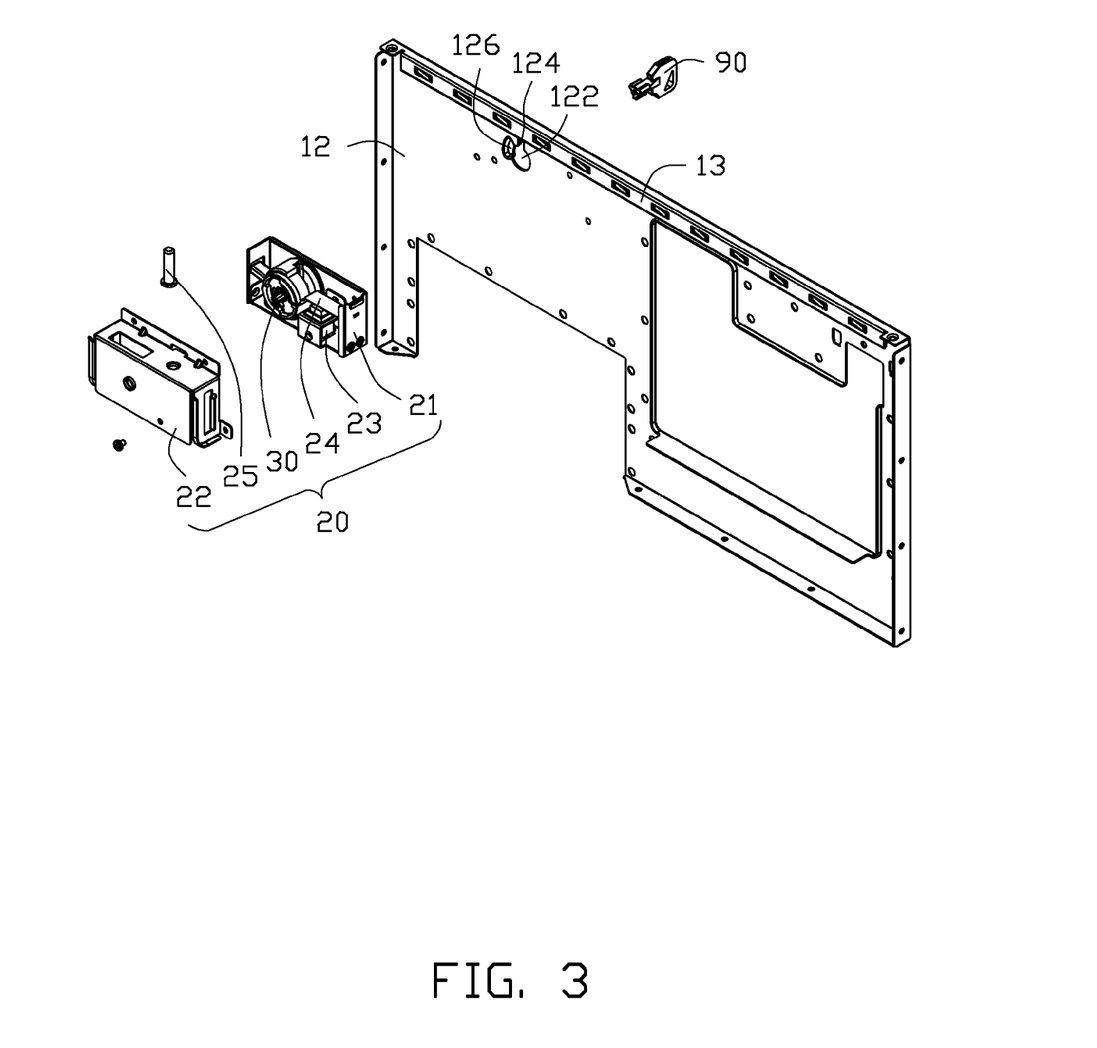
FIG. 3 is an exploded view of the electronic device of FIG. 1, but shown from a different aspect and with the top plate and the side plate thereof omitted.

Referring also to FIGS. 2 and 3, the front plate 12 defines a circular receiving hole 122 near the top thereof, a rectangular cutout 124 communicating with the receiving hole 122, and four connecting holes 128 around the receiving hole 122. The front plate 12 defines an arc-shaped concave groove 126 in an inner side thereof. A protrusion 127 is formed at an outer side of the front plate 12 corresponding to the concave groove 126. The concave groove 126 communicates with the receiving hole 122. The concave groove 126 is spaced from the cutout 124. A bent plate 13 extends downwardly from the top side of the front plate 12 and is parallel to the front plate 12. A gap (not shown) is thus defined between the bent plate 13 and the front plate 12.

The switch control unit 20 is mounted on the front plate 12 corresponding to the receiving hole 122 and the connecting holes 128. The switch control unit 20 includes a first frame 21, a second frame 22, a control assembly 30, a switch 23, a resilient element 24 located above the switch 23, and a contact element 25. The first frame 21 and the second frame 22 cooperatively form a mounting frame. The control assembly 30, the switch 23, the resilient element 24, and the contact element 25 are mounted in the mounting frame.

Figure 4:
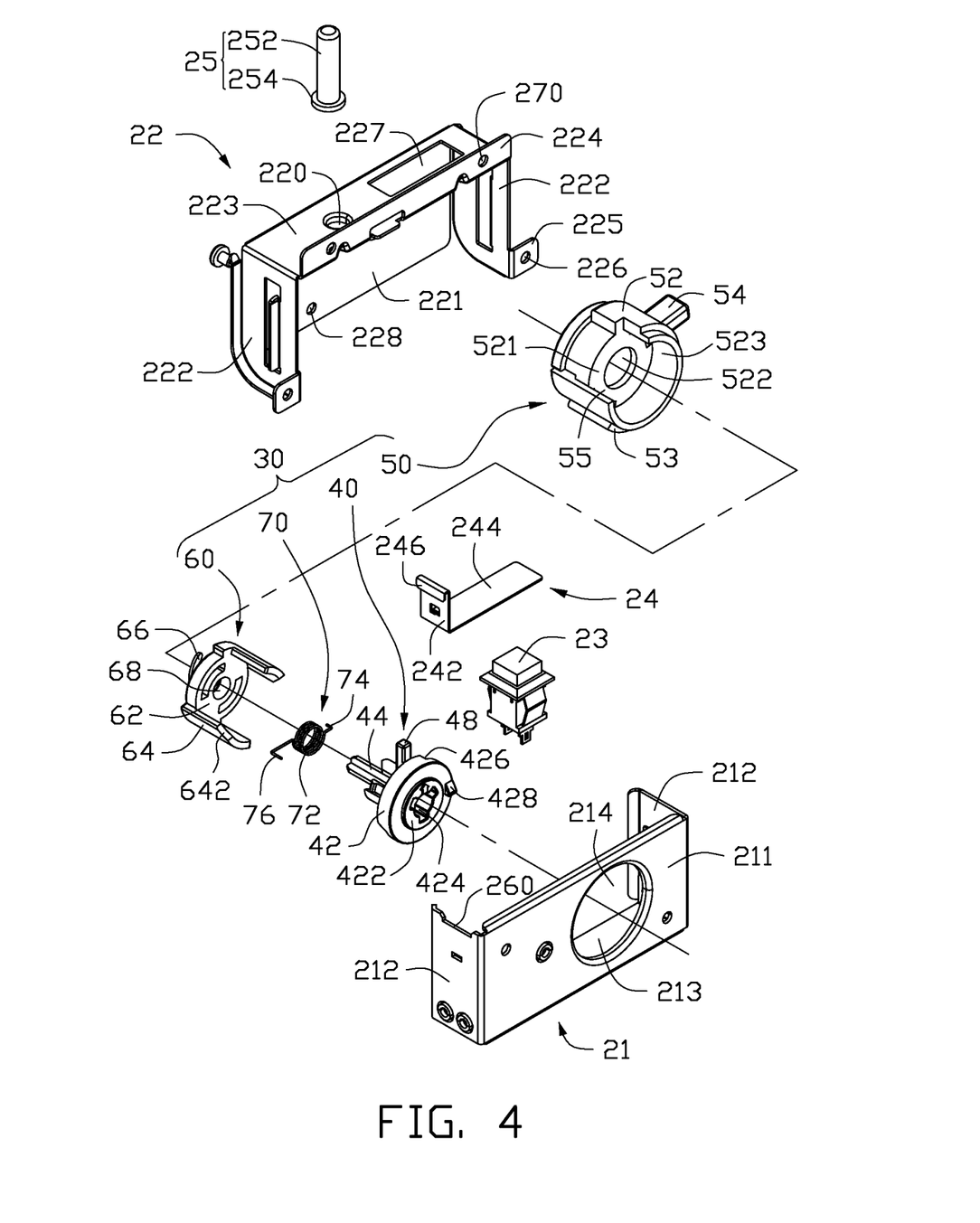
FIG. 4 is an exploded view of a switch control unit of the electronic device of FIG. 2.
Figure 5:
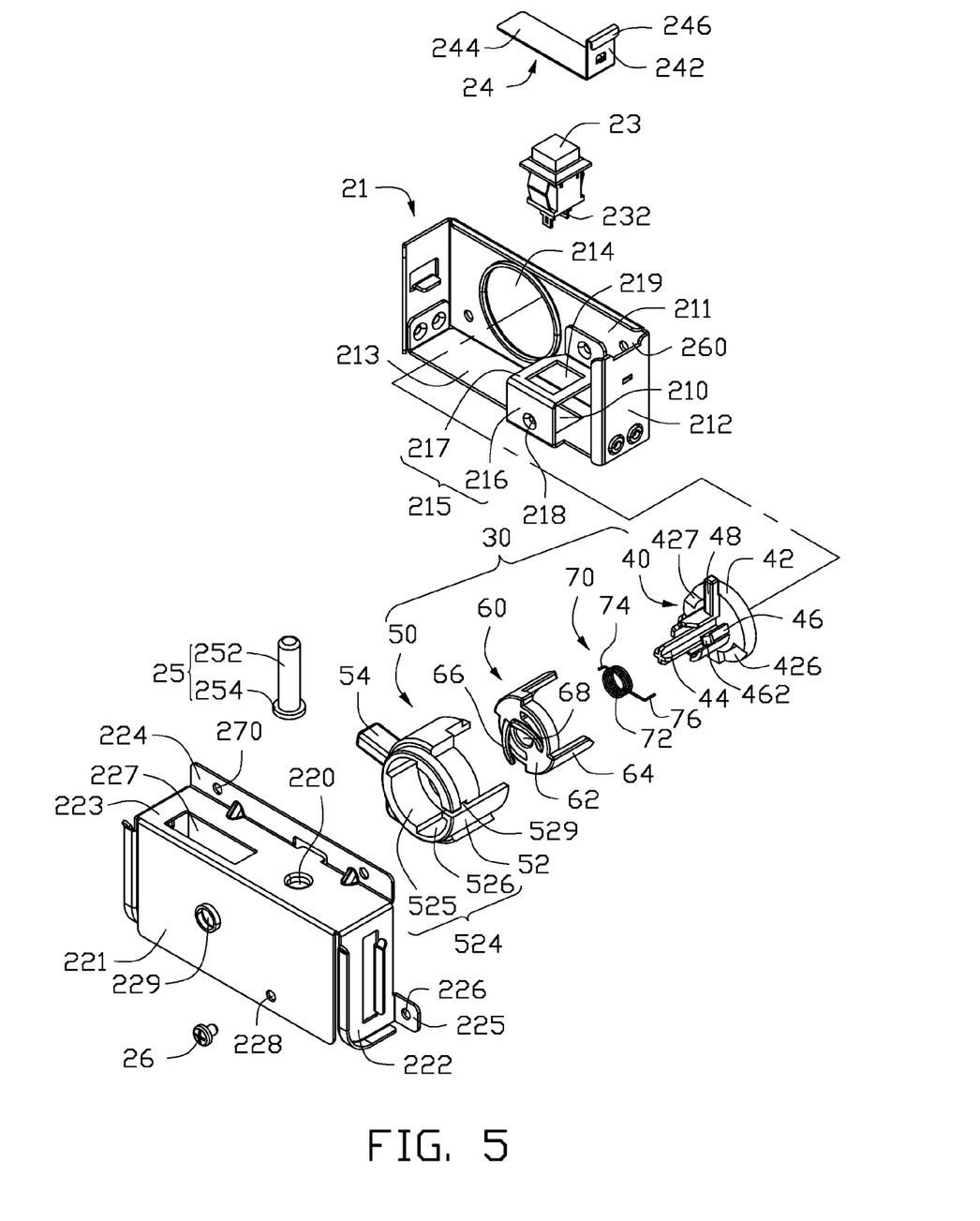
FIG. 5 is an exploded view of the switch control unit of the electronic device of FIG. 2, but shown from a different aspect.

Referring also to FIGS. 4 and 5, the first frame 21 includes a rectangular front cover 211, two rectangular side walls 212 extending perpendicularly and rearwards from two opposite lateral sides of the front cover 211, and a rectangular bottom plate 213 extending perpendicularly and rearwards from a bottom side of the front cover 211. The front cover 211 defines a circular through hole 214. A cutout 260 is defined in a top end of one of the side walls 212. The bottom plate 213 defines a rectangular through hole 210. A fixing portion 215 extends upwardly from a side of the bottom plate 213 far from the front cover 211, and then extends horizontally toward the front cover 211. The fixing portion 215 includes a connecting section 216, and a fixing section 217. The connecting section 216 defines a connecting hole 218 therein. A distal end of the fixing section 217 connects the front cover 211. The fixing section 217 defines a rectangular through hole 219 in alignment with the through hole 210 of the bottom plate 213.

The switch 23 extends downwardly through the through hole 219 of the fixing portion 215 and the through hole 210 of the bottom plate 213. The switch 23 includes two contact feet 232 at a bottom thereof. The two contact feet 232 are used for electrically connecting a socket on a circuit board. A middle portion of the switch 23 is sandwiched between the fixing portion 215 and the bottom plate 213 of the first frame 21. A top end of the switch 23 protrudes out of the through hole 219 of the fixing section 217. The two contact feet 232 protrude out of the through hole 210 of the bottom plate 213.

The resilient element 24 is substantially L-shaped, and made of a metal sheet. The resilient element 24 includes a rectangular connecting portion 242 oriented vertically, and a rectangular pressing portion 244 extending horizontally from a bottom end of the connecting portion 242. A hook 246 is formed by bending a top end of the connecting portion 242 outwardly and downwardly. The hook 246 is buckled in the cutout 260 of the top end of the side walls 212 of the first frame 21. The hook 246 and the pressing portion 244 are respectively located at two opposite sides of the connecting portion 242.

The second frame 22 includes a rectangular rear cover 221, two side walls 222 extending perpendicularly and frontward from two opposite lateral sides of the rear cover 221, a rectangular top plate 223 extending perpendicularly and frontward from a top side of the rear cover 221, and a rectangular fixing plate 224 extending perpendicularly and upwardly from a side of the top plate 223. The top plate 223 defines a rectangular through hole 227 and a circular through hole 220 therein. The rear cover 221 defines a through hole 229 near a center thereof, and a positioning hole 228 near a bottom side thereof. An ear 225 extends perpendicularly and outwardly from a bottom end of each side wall 222. The ear 225 defines a fixing hole 226 therein. The fixing plate 224 and the ears 225 are located in a same plane. A thickness of the fixing plate 224 is smaller than a distance between the bent plate 13 and the front plate 12. The fixing plate 224 defines a fixing hole 270 in each end thereof.

The contact element 25 includes a column-shaped main body 252, and a disk-shaped retaining portion 254 formed at a bottom end of the main body 252. The main body 252 has a diameter equal to that of the through hole 220 of the top plate 223 of the second frame 22, but smaller than that of the retaining portion 254. The main body 252 extends through the through hole 220 from a bottom side of the top plate 223.

The control assembly 30 includes an inner knob 40, an outer knob 50, an elastic abutting element 60 arranged between the inner knob 40 and the outer knob 50, and a spring 70.

The spring 70 includes a main body 72, and two hooks 74, 76 extending outwardly from two opposite sides of the main body 72.

Figure 8:
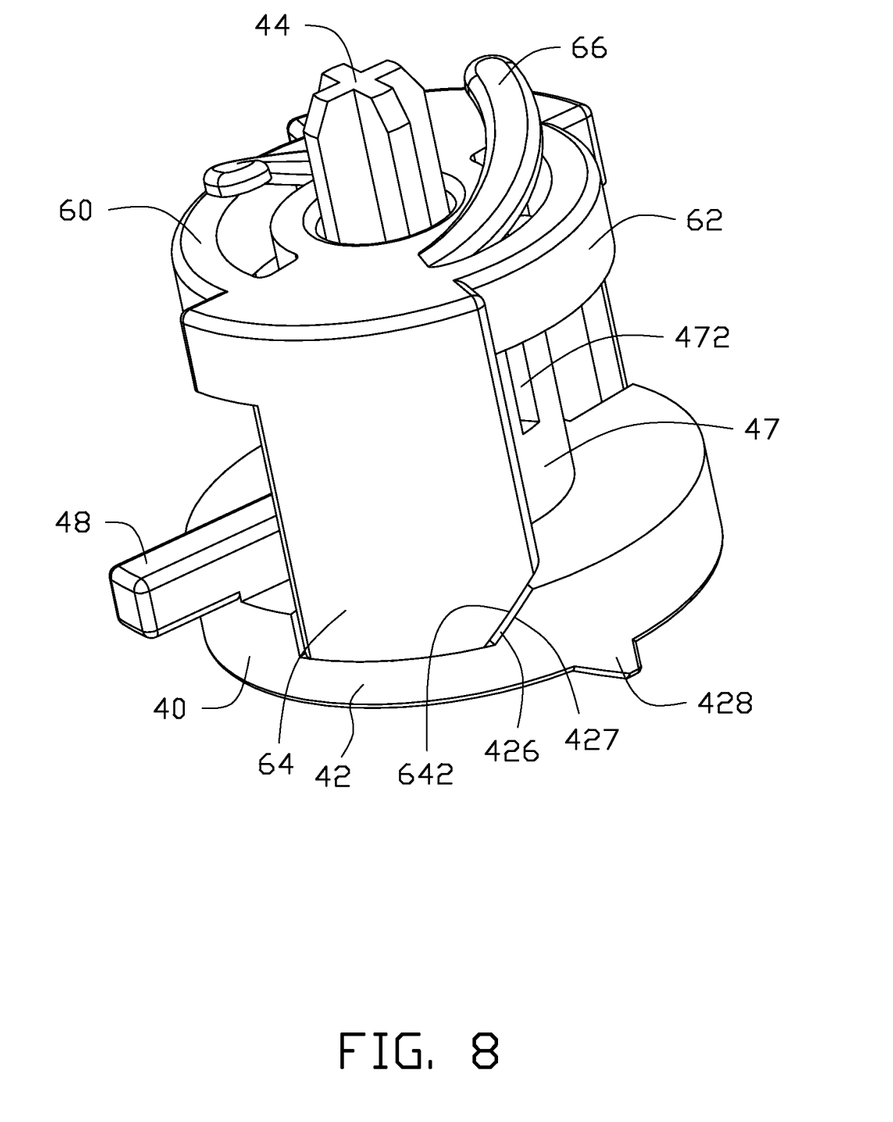
FIG. 8 is an enlarged, isometric, assembled view of an inner knob and the elastic abutting element of the switch control unit of FIG. 7.

The inner knob 40 includes a substantially disk-shaped main body 42, an elongated positioning shaft 44 extending perpendicularly from a center of a rear face of the main body 42, a plurality of fixing shafts 46 and extending portions 47 extending from the rear face of the main body 42, and an abutting portion 48 protruding outwardly from the rear face of the main body 42 along a radial direction of the main body 42. The fixing shafts 46 and the extending portions 47 are parallel to the positioning shaft 44. The fixing shafts 46 and the extending portions 47 are alternately arranged around a circumference of the positioning shaft 44. A length of each of the fixing shafts 46 and each of the extending portions 47 is smaller than that of the positioning shaft 44. Referring to FIG. 8, one of the extending portions 47 defines a clasp hole 472 for receiving the hook 74 of the spring 70 therein. The abutting portion 48 extends beyond an edge of the rear face of the main body 42.

A circular protrusion 422 protrudes outwardly from a center of a front face of the main body 42. A positioning groove 424 is defined in a center of the protrusion 422. A wedge-shaped block 428 protrudes outwardly from the front face of the main body 42 at a periphery of the protrusion 422. Two arc-shaped buckle grooves 426 are defined in the edge of the rear face of the main body 42. The buckle grooves 426 are symmetrical about the center of the main body 42. A slope 427 is formed at an end of each buckle groove 426. A wedge-shaped buckle block 462 extends outwardly from a distal end of each fixing shaft 46.

Figure 6:
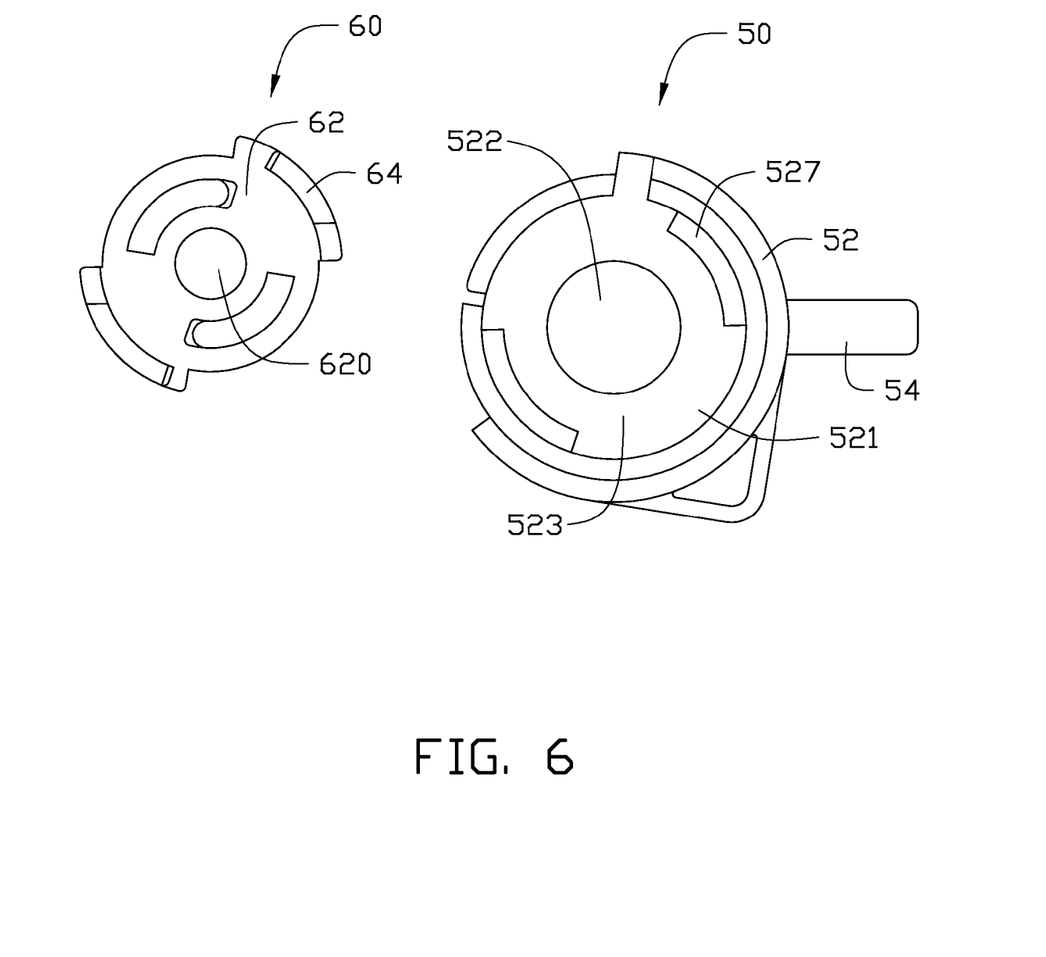
FIG. 6 is a front plan view of each of an outer knob and an elastic abutting element of the switch control unit of FIG. 4.

Referring also to FIG. 6, the outer knob 50 includes a column-shaped main body 52, and a radial shaft 54 extending outwardly from an outer periphery face of the main body 52 along a radial direction of the main body 52. The main body 52 forms an annular supporting seat 521 in an inner side thereof along an axial direction. A through hole 522 is defined in a center of the supporting seat 521. The outer knob 50 defines an opening 523 in a front end thereof (i.e. at a front side of the supporting seat 521). An arc-shaped travel groove 55 is defined in the outer peripheral face of the main body 52 parallel to an axial direction of the main body 52, so that an outer peripheral face of the supporting seat 521 can be seen. The outer knob 50 defines an embedding hole 524 in a rear end thereof (i.e. at a rear side of the supporting seat 521). The embedding hole 524 includes a cylindrical main portion 525, and two arc-shaped extending portions 526 located at two opposite sides of the main portion 525. The main portion 525 of the embedding hole 524 has a diameter smaller than that of the opening 523. The supporting seat 521 defines two arc-shaped through holes 527, corresponding to the extending portions 526. An area of each extending portion 526 is larger than that of each through hole 527. The extending portions 526 communicate with the through hole 522 and the opening 523. The supporting seat 521 defines a clasp hole 529 in the outer peripheral face thereof, for receiving the hook 76 of the spring 70 therein. A portion at an extremity of the front end of the main body 52 is recessed inwardly, and an annular step 53 is thereby formed.

The elastic abutting element 60 includes a supporting portion 62, two wings 64 extending perpendicularly from two opposite arc-shaped edges of a front side of the supporting portion 62, and two elastically deformable contacting legs 66 extending slantwise from a rear side of the supporting portion 62. The shape of the supporting portion 62 is so configured as to fittedly match the embedding hole 524. The supporting portion 62 defines a circular through hole 68 in a center thereof. A cross section of each wing 64 has a same shape as to that of each through hole 527 of the outer knob 50. Each wing 64 forms a slope 642 at a distal end thereof, corresponding to one slope 427 of the inner knob 40. In this embodiment, each contacting leg 66 has the shape of part of an imaginary spiral that winds around a central axis of the elastic abutting element 60. A distal end of each contacting leg 66 is away from the rear side of the supporting portion 62.

In assembly, the supporting portion 62 of the elastic abutting element 60 is received in the embedding hole 524 of the outer knob 50. The wings 64 of the elastic abutting element 60 are received in the through holes 527 of the outer knob 50. The inner knob 40 is received in the opening 523 of the outer knob 50. The positioning shaft 44 of the inner knob 40 extends through the through hole 522 of the outer knob 50 and the through hole 68 of the elastic abutting element 60, and extends beyond the supporting portion 62 of the elastic abutting element 60. The fixing shafts 46 extend through the through hole 522 of the outer knob 50, and the buckle blocks 462 are buckled on the supporting seat 521 around the through hole 522. The distal ends of the wings 64 of the elastic abutting element 60 engage in the buckle grooves 426 of the inner knob 40, and the slopes 642 of the wings 64 abut against the slopes 427 of the main body 42. The abutting portion 48 of the inner knob 40 extends through the travel groove 55 of the outer knob 50. When the inner knob 40 rotates in the outer knob 50, the abutting portion 48 can rotate within the travel groove 55 of the outer knob 50.

The spring 70 is sleeved around the positioning shaft 44. The hook 74 of the spring 70 is clasped in the clasp hole 472 of the extending portion 47 of the inner knob 40. The hook 76 of the spring 70 is clasped in the clasp hole 529 of the outer knob 50. Thus, the inner knob 40 and the outer knob 50 are elastically connected together by the spring 70.

The control assembly 30 is arranged between the first frame 21 and the second frame 22. The annular step 53 of the main body 52 of the outer knob 50 extends through the through hole 214 of the first frame 21 and abuts against the first frame 21. The positioning shaft 44 of the inner knob 40 extends through the through hole 229 of the second frame 22. The distal ends of the two contacting legs 66 of the elastic abutting element 60 elastically press the inner face of the rear cover 221 of the second frame 22 to make the elastic abutting element 60 elastically abut against the inner knob 40.

A screw 26 extends through the positioning hole 228 of the rear cover 221 of the second frame 22 and engages in the connecting hole 218 of the connecting section 216 of the first frame 21 to assemble the first and second frames 21, 22 together, whereby the retaining portion 254 of the contact element 25 abuts against the pressing portion 244 of the resilient element 24. The first and second frames 21, 22 cooperatively form a receiving room (not labeled) for receiving the control assembly 30 therein.

When mounting the switch control unit 20 on the casing 10, the fixing plate 224 of the second frame 22 is inserted into the gap between the bent plate 13 and the front plate 12, so that the fixing holes 270 of the fixing plate 224 and the fixing holes 226 of the ears 225 correspondingly align with the connecting holes 128 of the front plate 12. Then the mounting frame is mounted on the front plate 12 by screws. The protrusion 422 of the inner knob 40 extends through the receiving hole 122 of the front plate 12. The wedge-shaped block 428 of the inner knob 40 is received in and is movable within the concave groove 126 of the front plate 12.

Figure 7:
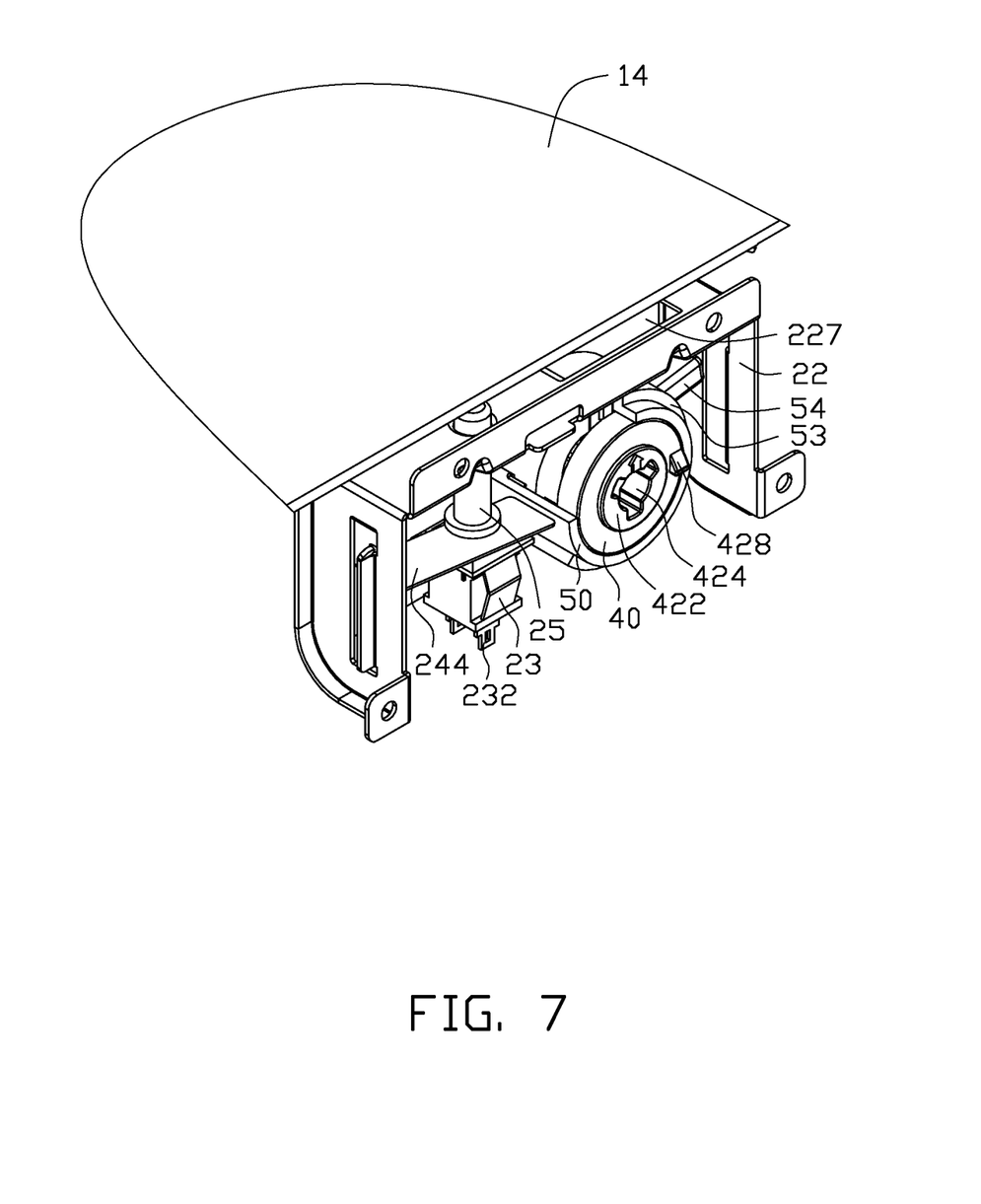
FIG. 7 is an enlarged view of the switch control unit and part of the top plate of the electronic device of FIG. 1, showing the switch control unit at an initial state.

Referring also to FIGS. 7-8, when covering the top plate 14 on the front plate 12, the top plate 14 presses the contact element 25 downwardly, then the retaining portion 254 of the contact element 25 resiliently presses the resilient element 24 downwardly and makes the pressing portion 244 deform, and then the pressing portion 244 of the resilient element 24 resiliently presses the top end of the switch 23 downwardly to turn on the switch 23. In contrast, when the top plate 14 is detached from the front plate 12, since the pressure exerted on the contact element 25 is removed, the pressing portion 244 of the resilient element 24 rebounds to its original state and moves upwardly to depart from the switch 23, so that the switch 23 moves upwardly and is turned off.

Figure 9:
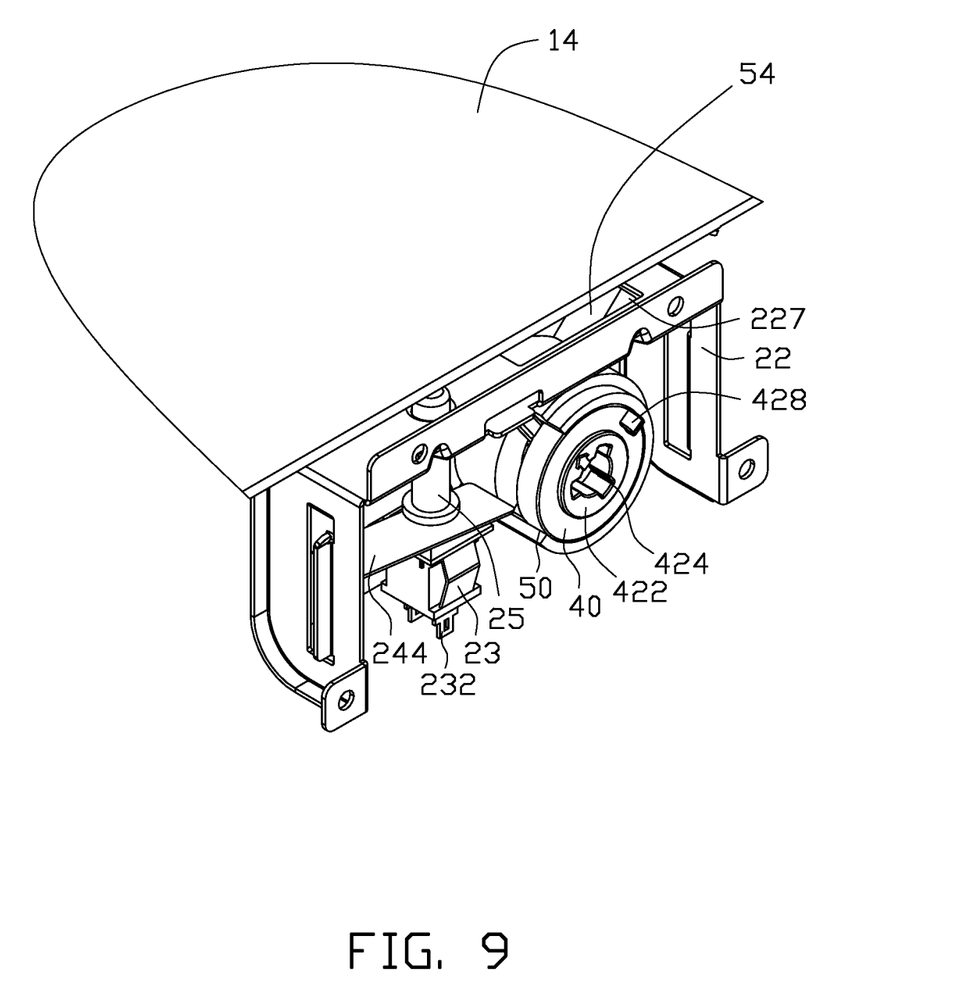
FIG. 9 is similar to FIG. 7, but showing the inner knob rotated a certain amount in a counterclockwise direction.
Figure 10:
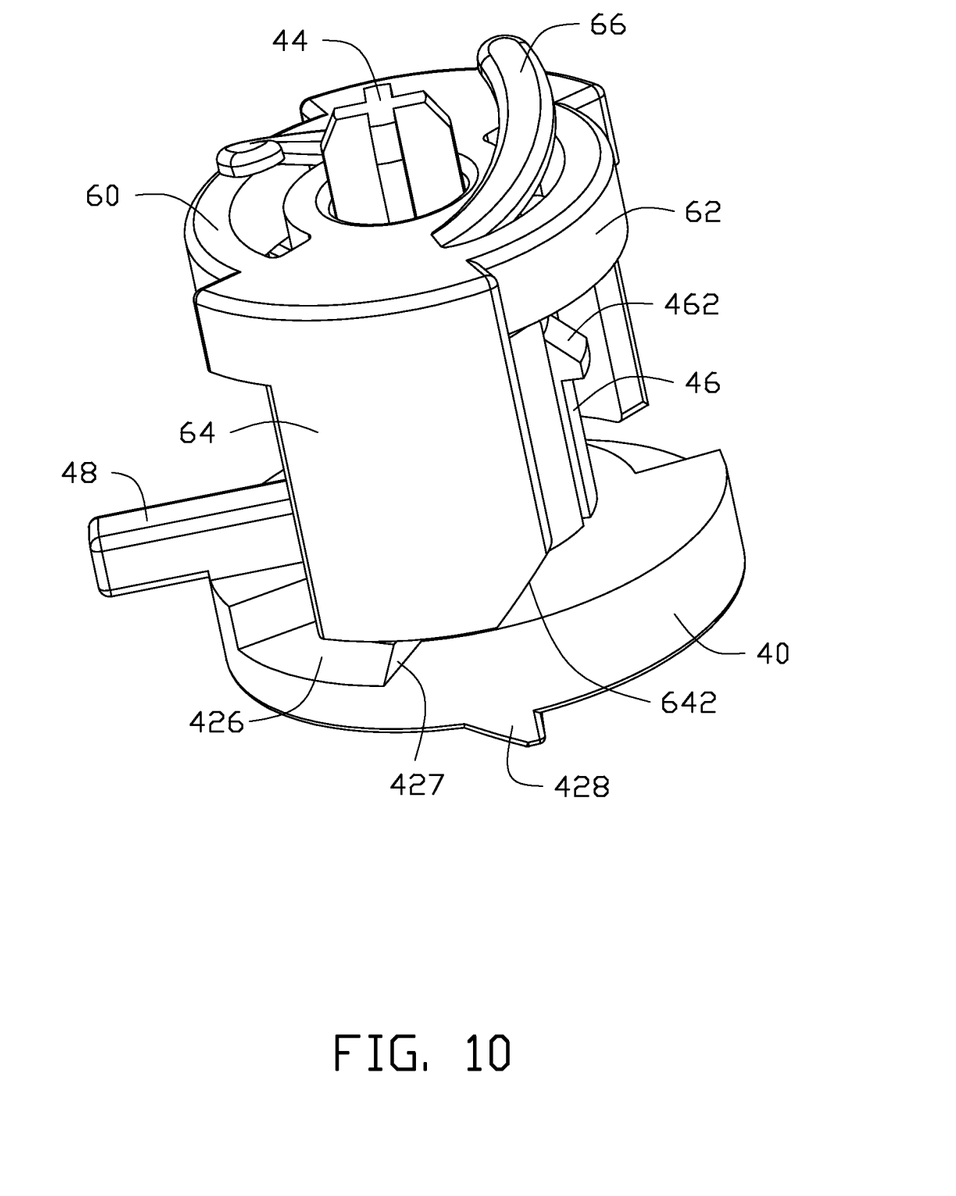
FIG. 10 is an enlarged, isometric, assembled view of the inner knob and the elastic abutting element of the switch control unit of FIG. 9.

Referring also to FIGS. 9 and 10, when the key 90 is inserted into the positioning groove 424 of the inner knob 40 of the switch control unit 20 and rotated along a counterclockwise direction, the inner knob 40 is caused to rotate correspondingly. Since the distal ends of the wings 64 of the elastic abutting element 60 engage in the buckle grooves 426 of the inner knob 40, the elastic abutting element 60 and the outer knob 50 are caused to rotate when the inner knob 40 rotates. When the control assembly 30 rotates a certain amount, the radial shaft 54 of the outer knob 50 abuts against an inner face of the top plate 14 to limit the outer knob 50 and the elastic abutting element 60 from rotating.

Figure 11:
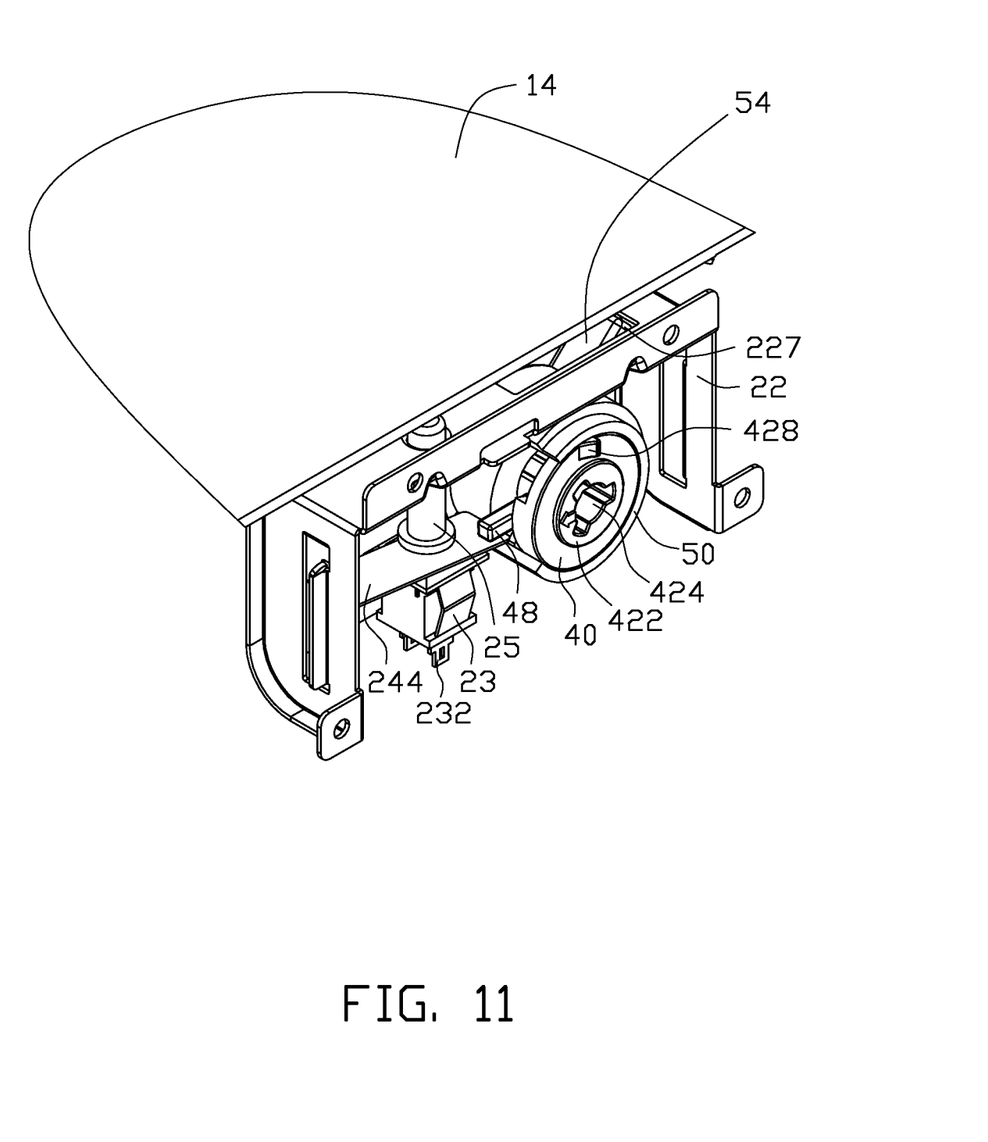
FIG. 11 is similar to FIG. 9, but showing the inner knob further rotated a certain amount in the counterclockwise direction, such that the switch control unit is at a final rotated state.

Referring also to FIG. 11, when the inner knob 40 is further rotated counterclockwise relative to the outer knob 50 and the elastic abutting element 60, the distal ends of the wings 64 of the elastic abutting element 60 depart from the buckle grooves 426 and abut against the rear face of the main body 42 of the inner knob 40. Thereby, the elastic abutting element 60 is forced to move toward the second frame 22 by the inner knob 40, and the two contacting legs 66 of the elastic abutting element 60 and the spring 70 are further elastically compressed.

When the inner knob 40 is continued to be rotated counterclockwise to a final position, the abutting portion 48 presses the pressing portion 244 of the resilient element 24, the pressing portion 244 of the resilient element 24 resiliently presses the top end of the switch 23 downwardly to turn on the switch 23, and the wedge-shaped block 428 of the inner knob 40 departs from the concave groove 126 and is buckled in the cutout 124 of the front plate 12.

Figure 12:
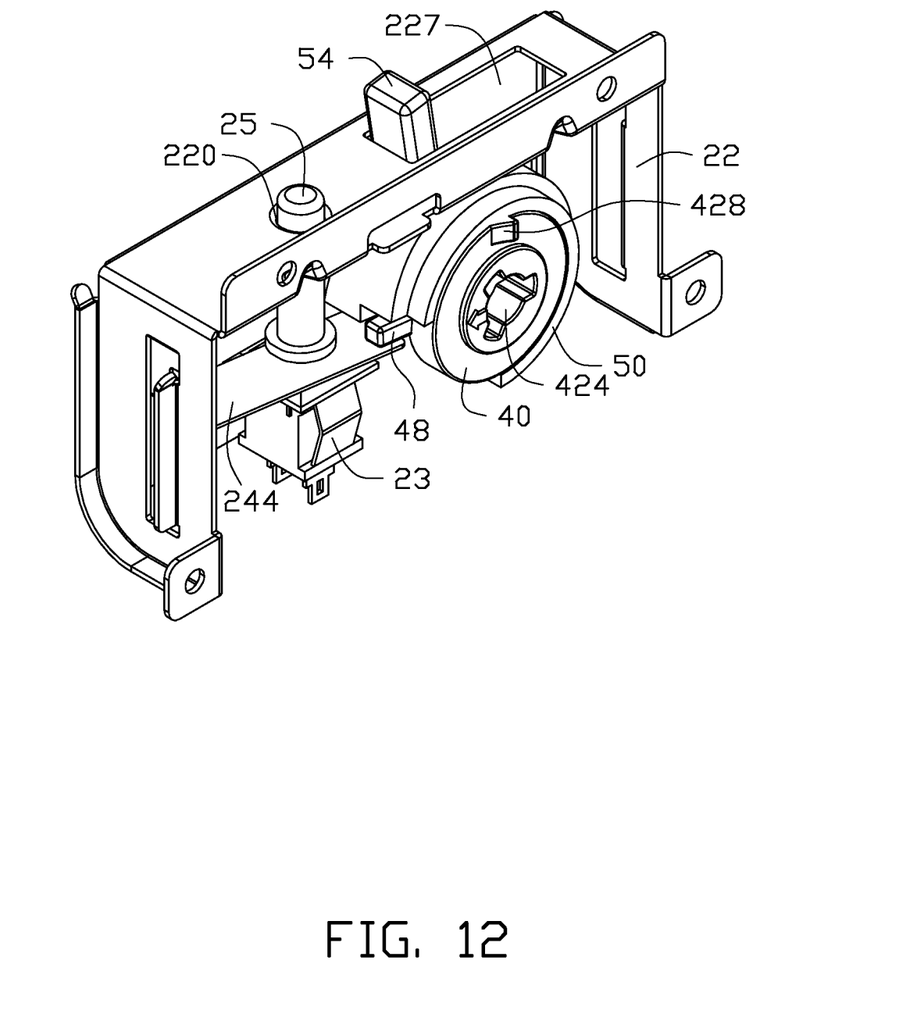
FIG. 12 is similar to FIG. 11, but showing a state of the switch control unit when the top plate is detached and removed.

Referring also to FIG. 12, since the wedge-shaped block 428 of the inner knob 40 is buckled in the cutout 124 of the front plate 12, when the top plate 14 is detached from the front plate 12, the switch 23 still remains at the turned-on state.

After the top plate 14 is detached from the front plate 12, the top plate 14 no longer limits the outer knob 50 from moving. The outer knob 50 with the elastic abutting element 60 is forced to rotate along the counterclockwise direction by the spring 70, until the distal ends of the wings 64 of the elastic abutting element 60 align with the buckle grooves 426 of the inner knob 40. Under the elastic force of the two contacting legs 66, the elastic abutting element 60 is forced to move toward the inner knob 40, so that the distal ends of the wings 64 of the elastic abutting element 60 engage in the buckle grooves 426 of the inner knob 40. Meanwhile, the radial shaft 54 of the outer knob 50 extends upwardly beyond the through hole 227 of the second frame 22. The radial shaft 54 of the outer knob 50 is higher than the top side of the front plate 12, and the top plate 14 cannot be placed on the front plate 12.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
   a front plate defining a receiving hole therein;
   a top plate covering a top side of the front plate; and
   a switch control unit comprising a mounting frame mounted on the front plate, a switch mounted in the mounting frame, a contact element located above the switch, and a control assembly, the control assembly comprising an inner knob rotatably received in the mounting frame, and the inner knob comprising an abutting portion protruding outwardly;
   wherein when the top plate completely covers the front plate, the top plate presses the contact element, and the contact element is resiliently held in a down position in which the contact element presses the switch and the switch is turned on;
   when the top plate is pulled away from the front plate, the contact element rebounds from the down position and moves upwardly to depart from the switch, such that the switch is no longer turned on by the contact element; and
   when the inner knob is rotated a predetermined first angle from a first position to a second position, the abutting portion abuts against the switch and keeps the switch on regardless of the position of the contact element.

2. The electronic device of claim 1, wherein the control assembly further comprises an elastic abutting element located between an inner face of the mounting frame and the inner knob, and the elastic abutting element resiliently presses the inner knob toward the front plate.

3. The electronic device of claim 2, wherein a block protrudes outwardly from one end of the inner knob, and the front plate defines a cutout communicating with the receiving hole; and when the inner knob is rotated to the second position, the block is buckled in the cutout of the front plate.

4. The electronic device of claim 3, wherein the front plate defines an arc-shaped concave groove in an inner side thereof, the concave groove communicating with the receiving hole, and the concave groove being spaced from the cutout; and when the inner knob is rotated from the first position to the second position, the block of the inner knob rotates from within the concave groove into the cutout of the front plate.

5. The electronic device of claim 2, wherein the control assembly further comprises an outer knob, the inner knob being received in one end of the outer knob, the elastic abutting element being received in another end of the outer knob and engaging with the inner knob.

6. The electronic device of claim 5, wherein a radial shaft extends outwardly from an outer peripheral face of the outer knob; and when the abutting portion of the inner knob presses the switch and the top plate is pulled away from the front plate, the radial shaft of the outer knob moves upwardly and is higher than the top side of the top plate.

7. The electronic device of claim 6, wherein an embedding hole is defined in the one end of the outer knob for receiving the inner knob therein, an opening being defined in the another end of the outer knob for receiving the elastic abutting element therein, a travel groove being defined in the outer periphery face of the outer knob parallel to an axial direction of the outer knob, and the abutting portion of the inner knob extending through the travel groove and being rotatable within the travel groove.

8. The electronic device of claim 7, wherein the outer knob comprises a column-shaped main body, the radial shaft extending outwardly from an outer periphery face of the main body along a radial direction, the main body forming a circular supporting seat in an inner side thereof along an axial direction, the embedding hole and the opening being locating at two opposite sides of the supporting seat, the supporting seat defining a through hole, and one end of the elastic abutting element extending through the through hole of the supporting seat and abutting against the inner knob.

9. The electronic device of claim 8, wherein the elastic abutting element comprises a supporting portion, and a wing extending from a side of the supporting portion, the supporting portion being received in the embedding hole of the outer knob, and the wing extending through the through hole of the supporting seat and abutting against the inner knob.

10. The electronic device of claim 9, wherein the embedding hole comprises a circular main portion, and an arc-shaped extending portion communicating with the main portion, a shape of the supporting portion of the elastic abutting element being so configured as to fittedly match the embedding hole, and the through hole of the supporting seat being arc-shaped and defined corresponding to the extending portion.

11. The electronic device of claim 9, wherein the inner knob defines an arc-shaped buckle groove in one side thereof, a distal end of the wing of the elastic abutting element being received in the buckle groove, the elastic abutting element and the outer knob being forced to rotate in unison with the inner knob when the inner knob is rotated.

12. The electronic device of claim 11, wherein the switch control unit further comprising a spring, the spring comprising two hooks at two ends thereof, one of the two hooks connecting the inner knob, and the other hook connecting the outer knob; when the top plate completely covers the front plate and the inner knob is rotated a second angle smaller than the first angle from the first position toward the second position, the radial shaft of the outer knob abuts against an inner face of the top plate to limit the outer knob and the elastic abutting element from further rotating; and when the inner knob is further rotated beyond the second angle toward the second position, the distal end of the wing of the elastic abutting element departs from the buckle groove and the spring is compressed.

13. The electronic device of claim 9, wherein the elastic abutting element further comprises a contacting leg extending slantwise from another opposite side of the supporting portion, the contacting leg of the elastic abutting element elastically pressing an inner face of the mounting frame to make the elastic abutting element elastically abut the inner knob.

14. The electronic device of claim 8, wherein the supporting seat of the outer knob defines a through hole in a center thereof, the inner knob comprising a substantially disk-shaped main body and a plurality of fixing shafts extending from a side of the main body, a wedge-shaped buckle block extending outwardly from a distal end of each fixing shaft, the buckle blocks being buckled on the main body after the fixing shafts extends through the through hole of the supporting seat.

15. The electronic device of claim 14, wherein the inner knob further comprises an elongated positioning shaft extending from a center of the side of the main body, the elastic abutting element defining a through hole in a center thereof, and the positioning shaft extending through the through hole of the outer knob and the through hole of the elastic abutting element in sequence.

16. The electronic device of claim 15, wherein the mounting frame comprises a first frame and a second frame assembled together, the control assembly being arranged between the first frame and the second frame, the first frame defining a through hole, the main body of the outer knob extending through the through hole of the first frame and the receiving hole of the front plate in sequence, the second frame defining a through hole, the positioning shaft of the inner knob extending through the through hole of the second frame after extended through the through hole of the outer knob and the through hole of the elastic abutting element.

17. The electronic device of claim 1, further comprising a resilient element located between the switch and the contact element, wherein when the top plate presses the contact element downwardly, the contact element resiliently presses the resilient element downwardly to make the resilient element deform, and the resilient element resiliently presses the switch downwardly to turn on the switch.

18. The electronic device of claim 17, wherein the resilient element is substantially L-shaped, and comprises a connecting portion and a pressing portion, the connecting portion being fixed on the mounting frame, and the pressing portion being located above the switch; when the contact element resiliently presses the resilient element downwardly, the pressing portion deforms and resiliently presses the switch downwardly to turn on the switch; and when the pressure exerted on the contact element is removed, the pressing portion of the resilient element rebounds to its original state and moves upwardly to depart from the switch such that the switch is no longer turned on by the contact element.

19. The electronic device of claim 1, wherein a hook is formed by bending a top end of the connecting portion outwardly, the hook being buckled on the mounting frame, the hook and the pressing portion being respectively located at two opposite sides of the connecting portion.

20. The electronic device of claim 1, further comprising a key, a positioning groove being defined in an end of the inner knob for receiving the key therein; and when the key is inserted into the positioning groove of the inner knob and rotated, the inner knob is correspondingly caused to rotate.

* * * * *